UNITED STATES PATENT OFFICE.

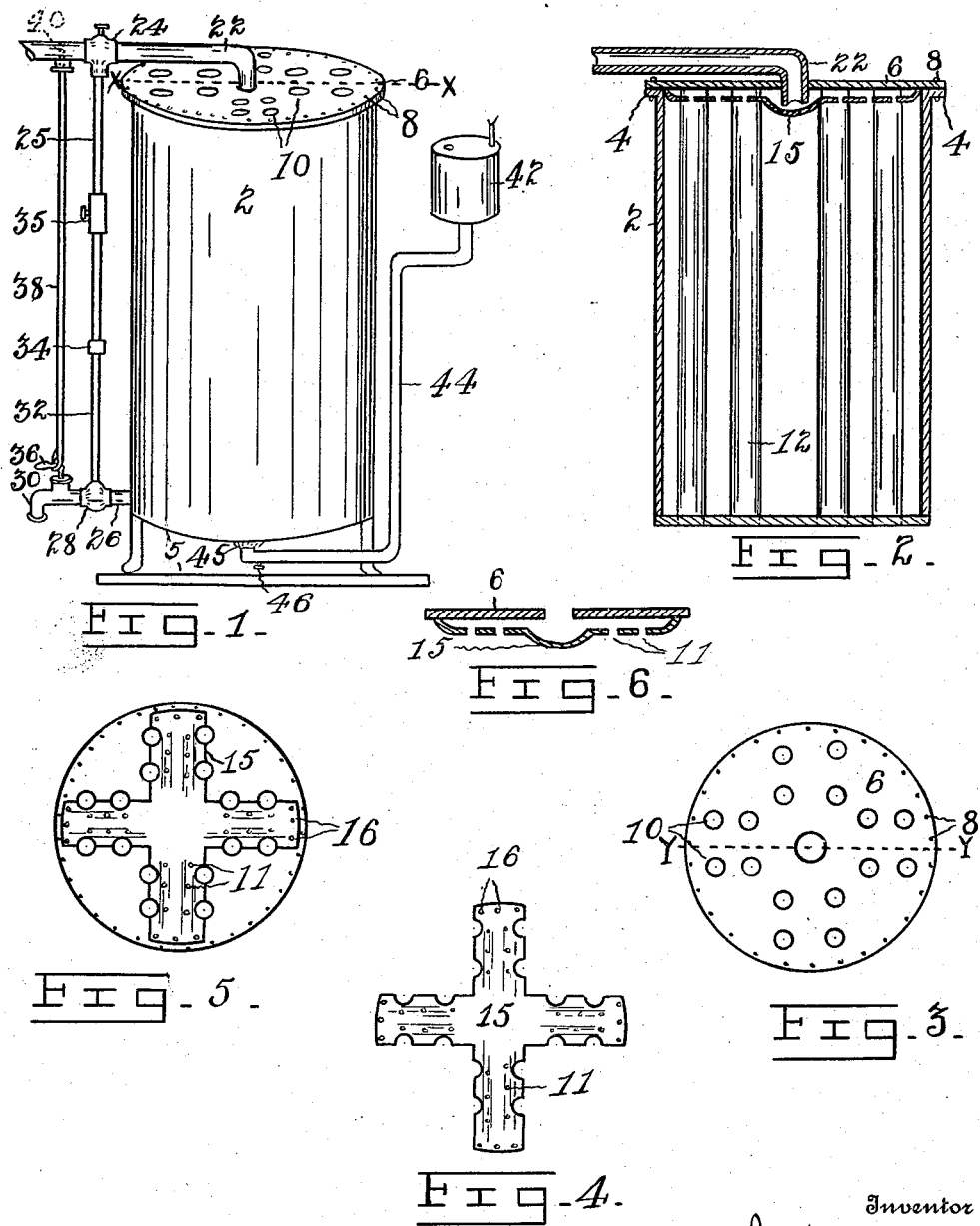

WILLIAM J. DWYER, OF BERNARD, IOWA.

HEATER.

1,201,161.  Specification of Letters Patent.  Patented Oct. 10, 1916.

Application filed September 8, 1914, Serial No. 860,675. Renewed July 14, 1916. Serial No. 109,405.

*To all whom it may concern:*

Be it known that I, WILLIAM J. DWYER, a citizen of the United States, residing at Bernard, in the county of Dubuque and State of Iowa, have invented certain new and useful Improvements in Heaters, of which the following is a specification.

My invention relates to heating devices and it consists in a tank set perpendicularly, and provided with heat flues that extend vertically through the tank.

It further consists in supplying the tank with water, delivered in a spray against the flues on the inside of the tank, and also in certain means for operating the heater.

These features will be fully explained and illustrated in the following specification when read in connection with the drawings accompanying the same and forming a part hereof.

Figure 1, is a perspective view of the tank and connections ready for use. Fig. 2, is an enlarged vertical section through line X—X of the tank in Fig. 1. Fig. 3, is a plan view of the top of the tank. Fig. 4, is a plan view of the spreader whereby the water is sprayed against the flues. Fig. 5, shows a plan view of the under side of Fig. 3, with spreader attached. Fig. 6, is a section through line Y—Y of Fig. 3.

Like characters of reference denote corresponding parts in each of the figures.

Referring to the drawings, 2 designates the body of the tank, which is preferably round and is provided at the top with a flange 4, and rests upon a base 5. The top of the tank is sealed by a cover 6 bolted to the flange 4 by the bolts 8 and is provided with openings 10. Through the cover and the bottom of the tank are secured flues 12 which extend through the base 5 and through the cover 6 permitting the heat to pass up through the flues.

On the under side of the cover 6 is placed a spreader 15, shown in Figs. 4 and 5 which is secured to the under side of the cover 6 by bolts 16. This spreader is in the form of a cross and curved downward along its center and the edges are cut out around the openings 10 of the flues. This spreader or sprayer is provided with numerous small openings 11 through which the water is delivered against the flues in the heater. Through the center of the cover 6 is an opening in which is secured the supply pipe 22, which extends to the water supply. In this pipe 22 is a T or coupler 24 and in the coupler is secured a tube 25. Also near the bottom of the tank is a pipe 26 which extends out and is provided with a T 28 in which is secured a faucet 30. In the T 28 is a pipe 32 which is coupled with the pipe 25 by the coupling 34. In the pipe 25 is a stop cock 35.

The faucet 30 is supplied with a handle 36 and to this handle is removably attached a rod 38 that extends up to the tube 22 and is secured with a valve 40 (shown in dotted lines) in the tube 22. On the outside of the heater is set a gasolene or other fuel supply tank 42 which is connected into the base 5 by the tube 44 and is supplied with a burner 45 and a stop cock 46.

The manner of operating my device is substantially as follows: The operator lights the burner 45 and the heat passes up through the flues 12 out through the openings 10 in the cover; he then grasps the handle 36 of the faucet 30 and closes the faucet, this action partly opens the valve 40 in the tube 22 and allows the water to pass into the hollow of the spreader 15, and as this is bolted to the under surface of the cover 6 the water will pass out through the small holes 11 and be formed into a spray, which will strike against the outer side of the heated flues and will be rapidly transformed into hot water and steam, and will continue until the tank is nearly full, as shown by the water tube 25. If the operator desires to obtain hot water he turns the handle 36 of the faucet and receives it direct from the lower end of the tank, the stop cock 35 being closed; this will partly open the pipe 22 and allow the same amount of cold water to pass in as he takes out of the hot water from the tank, but if he desires to draw off the hot water and not replenish the tank he removes the rod 38 from the handle 36 and that leaves the valve 40 closed. If he desires cold water mingled with the hot then he opens the faucet and the stop cock 35 and receives the water through the pipes 25 and 32 with the hot water. In this manner he can maintain the water at such a temperature as he pleases for his various uses and the tank always full and to such height as he desires. This is intended more especially for barbers but it may be equally effective for bath rooms, hospitals and the like where it is desired to have a supply of hot water on short notice or a continued supply of both hot and cold.

Having now described my invention what I claim is:—

In a heater of the character described, a cylindrical body provided at its upper edge with a flange, a cover secured to said flange, a base secured to the lower end of said body, flues secured to the cover and base plates and having their open ends extend through said cover and base, a concave spreader member secured to said cover, the edges of said spreader member contacting with the cover to form a water tight compartment between said spreader and cover, means for delivering the water to said water compartment, means for spraying water from said water compartment against the flues, and a suitable burner secured beneath the base, substantially as described.

In testimony whereof I affix my signature in presence of two witnesses.

WILLIAM J. DWYER.

Witnesses:
M. M. CADY,
FRANZ H. WEIHE.

Copies of this patent may be obtained for five cents each, by addressing the "Commissioner of Patents, Washington, D. C."